United States Patent
Shimizu et al.

(10) Patent No.: US 7,155,256 B2
(45) Date of Patent: Dec. 26, 2006

(54) RADIO COMMUNICATION NETWORK SYSTEM

(75) Inventors: Atsushi Shimizu, Kawasaki (JP); Susumu Matsui, Kawasaki (JP); Shouji Fukuzawa, Kawasaki (JP)

(73) Assignee: Hitachi Ltd., Tokyo (JP)

( * ) Notice: Subject to any disclaimer, the term of this patent is extended or adjusted under 35 U.S.C. 154(b) by 87 days.

(21) Appl. No.: 11/109,872

(22) Filed: Apr. 20, 2005

(65) Prior Publication Data

US 2005/0288008 A1 Dec. 29, 2005

(30) Foreign Application Priority Data

Jun. 24, 2004 (JP) ............................. 2004-185791

(51) Int. Cl.
*H04M 1/00* (2006.01)
(52) U.S. Cl. .................. 455/561; 455/550.1; 455/507; 455/426.1; 370/401; 370/328; 709/238
(58) Field of Classification Search ................ 455/561, 455/550.1, 507, 426.1; 370/401, 328; 709/238
See application file for complete search history.

(56) References Cited

U.S. PATENT DOCUMENTS

| | | | |
|---|---|---|---|
| 6,205,475 B1 * | 3/2001 | Pitts ........................... | 709/218 |
| 6,965,580 B1 * | 11/2005 | Takagi et al. ................ | 370/312 |
| 7,062,275 B1 * | 6/2006 | Shiraga ....................... | 455/450 |
| 2003/0129925 A1 * | 7/2003 | Toyoshima et al. ............ | 451/5 |
| 2004/0198395 A1 * | 10/2004 | Kimoto et al. ........... | 455/456.1 |
| 2005/0032475 A1 * | 2/2005 | Mauney et al. ........... | 455/41.2 |
| 2005/0119007 A1 * | 6/2005 | Filizola et al. ........... | 455/456.1 |
| 2006/0182128 A1 * | 8/2006 | Nakata et al. .............. | 370/401 |

FOREIGN PATENT DOCUMENTS

JP 2003-249937 9/2003

* cited by examiner

*Primary Examiner*—Danh Cong Le
(74) *Attorney, Agent, or Firm*—McDermott Will & Emery LLP

(57) ABSTRACT

A radio communication network system provides a method of managing radio communication base stations and mobile terminals for accomplishing an access to the Internet from a mobile terminal and communications between mobile terminals. A base station management terminal, radio communication base stations, and mobile terminals reference their communication path information created by exchanging their adjacent terminal information and communication path information to ensure their respective communication paths to other terminals. Even if two mobile terminals cannot communicate due to their radiowaves failing to arrive at their destinations, the mobile terminals can provide a communication path for making communications therebetween through a communication line, the radio communication base station, and the base station management terminal.

10 Claims, 8 Drawing Sheets

RADIO COMMUNICATION NETWORK SYSTEM

INCORPORATION BY REFERENCE

The present application claims priority from Japanese application JP2004-185791 filed on Jun. 24, 2004, the content of which is hereby incorporated by reference into this application.

BACKGROUND OF THE INVENTION

The present invention relates to data transmission/reception technologies and information communication technologies between a terminal and a base station in a radio communication network.

An ad hoc network technology utilizes radio communications to build a network at a site itself at which terminals are brought together. This technology mainly features in that terminals recognize one another for connection to transmit and receive information about adjacent terminals to and from one another to build a multi-hop communication environment. In the multi-hop communication environment, terminals which cannot directly communicate with each other on the air can utilize other terminals located between these terminals as communication relay terminals to make communications therebetween.

On the other hand, a service has been provided for enabling mobile terminals to access the Internet through radio base stations installed for this purpose. For example, JP-A-2003-249937 discloses a radio communication system which addresses a situation in which a mobile terminal cannot directly communicate with a radio base station due to a difference in mode such as an infrastructure mode, an ad hoc mode and the like, a difference in radio communication frequency, and the like, and enables communications between the mobile terminal and the radio base station through an installed communication relay terminal which has a plurality of interfaces that enable communications in different modes at different frequencies, thereby permitting the mobile terminal to access the Internet.

In a well established radio communication environment which supports a number of mobile terminals, each of which can communicate with a plurality of radio base stations, a certain mobile terminal can access the Internet through a plurality of possible communication paths, giving rise to a need for selecting and setting an optimal communication path. However, the aforementioned JP-A-2003-249937 does not describe a radio base station for communications with an optimal quality or a method of selecting and setting an optimal communication path in a mobile terminal and a radio base station for sending communication packets to an Internet gateway.

Therefore, a need exists for a method of accessing the Internet from a mobile terminal at any site with a high quality, making use of a plurality of radio base stations.

SUMMARY OF THE INVENTION

The present invention provides a method of managing mobile terminals which have the multi-hop communication ability, and a radio communication base station which enables the mobile terminals to access the Internet.

The present invention provides a mechanism which permits a mobile terminal to select a communication base station which offers an optimal communication quality from among a plurality of communication base stations in a situation where a plurality of mobile terminals are in course of multi-hop communications implemented by the aforementioned ad hoc network technology.

The present invention provides a mechanism which permits mobile terminals belonging to different groups of mobile terminals from each other to communicate with each other through a wired network such as base station facilities, Internet networks and the like even if a mobile terminal belonging to a certain group of mobile terminal and a mobile terminal belonging to another group of mobile terminals cannot make multi-hop communication with each other over the air due to limitations in a radio accessible distance in a situation where a plurality of mobile terminals are making multi-hop communications implemented by the ad hoc network technology.

The present invention also provides a mobile terminal which has the ability to determine in accordance with a particular situation of the mobile terminal whether a communication should be made through a communication path provided through radio base stations and communication lines as mentioned above, or through a radio communication path implemented by the ad hoc network technology without utilizing the communication line.

The present invention also provides a mechanism which permits each mobile terminal to select and set an optimal communication path for sending communication packets to a terminal having an Internet gateway function with reference to communication path information which is created by respective mobile terminals which exchange information on their adjacent terminals.

The present invention also provides a mechanism which permits each mobile terminal to detect a communication path through which the terminal sends communication packets to a terminal which has an Internet gateway function.

With this mechanism, even if a mobile terminal cannot directly communicate with a radio communication base station, the mobile terminal can communicate with the radio communication base station through other mobile terminals, serving as relay terminals, to access the Internet.

The present invention also provides means through which a base station management terminal, a radio communication base station, and a mobile terminal exchange respective information about adjacent terminals and communication paths with one another, thereby permitting each terminal to keep track of communication paths to other terminals.

In this way, even if two mobile terminals cannot communicate with each other due to an excessively long distance beyond their accessing abilities, the mobile terminals can set up a communication path for communicating therebetween through a communication line, the radio communication base station, a base station management terminal, and even other mobile terminals.

Also, even if a mobile terminal moves between coverage areas of respective radio communication base stations, an optimal communication path can be selected for accessing the Internet.

According to the present invention, the mobile terminal can access the Internet even if the mobile terminal is located out of a coverage area of a radio communication base station.

Other objects, features and advantages of the invention will become apparent from the following description of the embodiments of the invention taken in conjunction with the accompanying drawings.

DETAILED DESCRIPTION OF THE EMBODIMENTS

1. Basic Device Configuration

Figure 1:
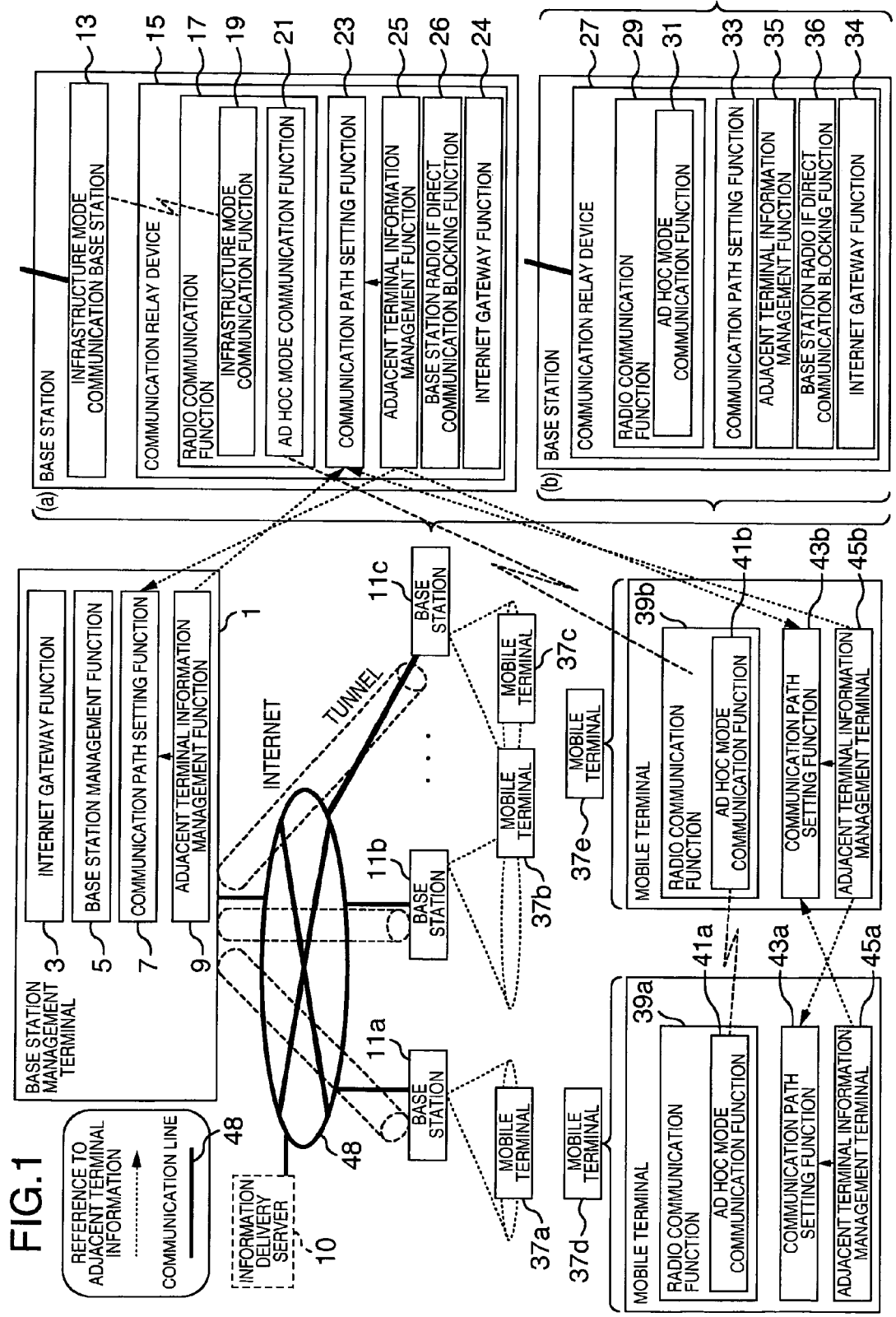
FIG. 1 is a block diagram illustrating an exemplary configuration of a system in one embodiment of the present invention.

FIG. 1 is a block diagram illustrating a logical configuration according to one embodiment of the present invention.

Each of mobile terminals 37a–37c (collectively designated by 37) has a radio communication function 39, a communication path setting function 43, and an adjacent terminal information management function 45. An adjacent terminal refers to a mobile terminal which is located within one hop (which is a distance over which radiowaves can directly attain from another mobile terminal).

A plurality of mobile terminals 37 can be connected to one another in radio communications. These mobile terminals 37 may have a data transfer function so that they relay data, thereby enabling communications between a plurality of mobile terminals 37 which are located beyond a distance over which radiowaves can directly attain. A communication path for making the foregoing communication is dynamically changed by the communication path setting function 43 based on adjacent terminal information mutually transmitted and received on a periodic basis by the adjacent terminal information management functions 45 of the respective mobile terminals in accordance with a change in the positional relationship between the mobile terminals 37, a change in the radio communication situation, or the like.

A radio communication base station (hereinafter called the "base station") 11 can take (a) a configuration implemented by an infrastructure mode communication base station 13 and communication relay device 15, or (b) a configuration implemented by a communication relay device 27. The infrastructure mode refers to a communication mode in which a communications is made through an access point.

A communication relay device 15 in the base station (a) has a communication path setting function 23, an adjacent terminal information management function 25, and a base station radio interface direct communication blocking function 26. The radio communication function 17 comprises an infrastructure mode communication function 19, and an ad hock mode communication function 21 for an ad hoc mode in which a peer-to-peer communication is made with another device which has a communication function, bypassing an access point. The two functions 19, 21 can be operated in parallel.

The infrastructure mode communication base station 13 is connected to a wired network such as the Internet 48 (hereinafter called the "Internet"), and also communicate with the infrastructure mode communication function 19. The ad hoc mode communication function 21 makes communications with an ad hoc mode communication function 41 of the mobile terminal 37.

The base station 11 may use the base station radio interface direct communication blocking function 26 for making a setting to prevent radio communications with another base station. This setting prevents a closed communication path which would cause MAC (Media Access Control) frames and communication packets to loop around the closed communication path to result in a failed communication.

The communication relay device 27 in the base station (b) has a radio communication function 29, communication path setting function 23, adjacent terminal information management function 25, and base station radio interface direct communication blocking function 26. The radio communication function 17 has the ad hoc mode communication function 21. The communication relay device 27 is connected to a wired network (Internet 48) through a communication line.

In both configurations (a), (b) described above, the base station 11 has an Internet gateway function 24, 34. The Internet gateway function 24, 34 forces the base station 11 to function as a relay point when the mobile terminal 37 accesses an Internet site such as an information delivery server 10.

A base station management terminal 1 has an Internet gateway function 3, a base station management function 5, a communication path setting function 7, and an adjacent terminal information management function 9. The Internet gateway function 3 is provided for the base station management terminal 1 to act as a relay point when the base station 11 or mobile terminal 37 accesses an Internet site such as the information delivery server 10. The base station management function 5 manages information on communication paths to the base station 11 and mobile terminal 37. The base station management terminal 1 is connected to the Internet 48.

When a network such as the Internet 48 intervenes between the base station management terminal 1 and the base station 11, the adjacent terminal information can be exchanged between the base station management terminal 1 and the base station 11 using a known tunnel technique or the like.

The base station management terminal 1, communication relay devices 15, 27 of the base station 11, and mobile terminal 37 exchange the adjacent terminal information with one another, respectively, using their adjacent terminal information management functions 9, 25, 45, to keep track of the network topology, and set communication paths for their associated terminals, respectively, using their communication path setting functions 7, 23, 43.

Figure 2:
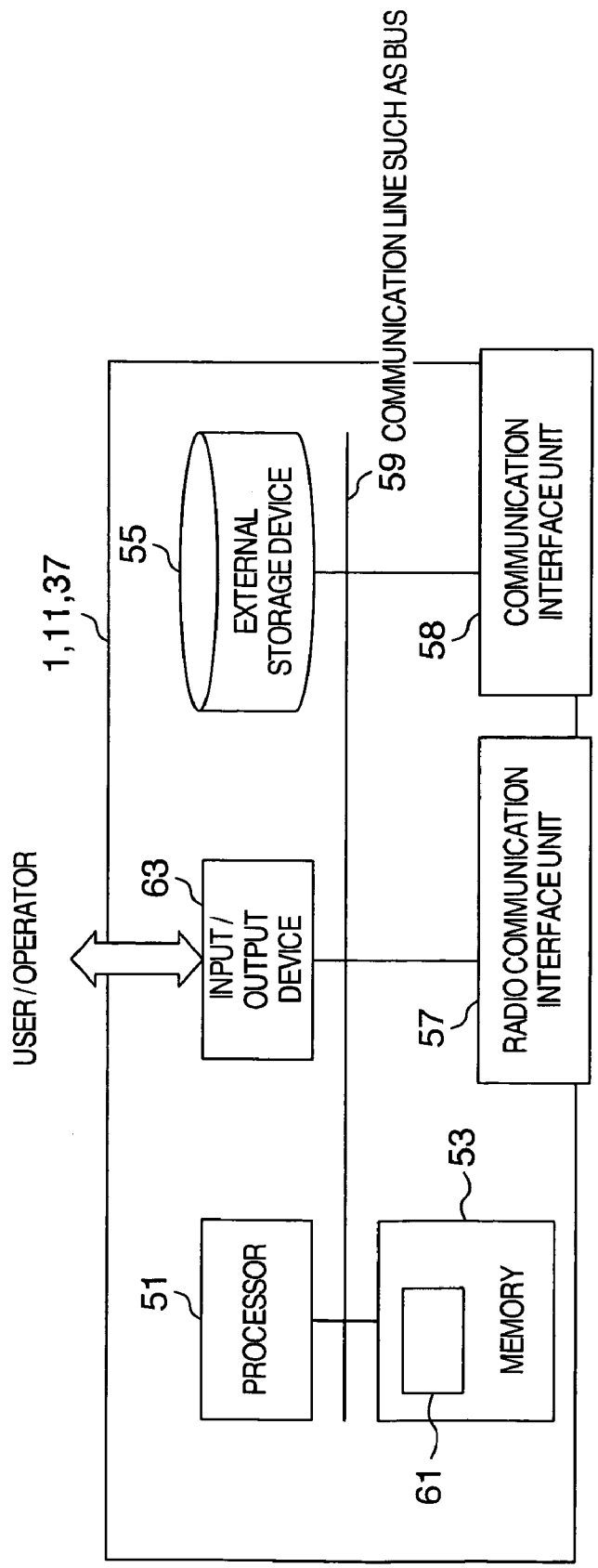
FIG. 2 is a block diagram illustrating the hardware configuration of a communication terminal associated with one embodiment.

FIG. 2 is a block diagram illustrating an exemplary physical configuration of a general information processing apparatus which can embody the base station management terminal 1, the communication relay devices 15, 27 of the base station 11, and the mobile terminal 37.

Specifically, the illustrated information processing apparatus comprises a processor 51 for executing an information processing program 61; a memory 53 for storing the information processing program 61 executed by the processor 51, and a variety of data referenced by the processor 51; a non-volatile external storage device 55 for storing the information processing program 61 and a variety of data; a wired communication interface unit 58 for connection to the Internet 48 to transmit and receive data to and from another information processing apparatus or a communication device; a radio communication interface device 57 for transmitting and receiving data to and from another information processing apparatus or a communication device through radio communications; and an input/output device 63 involved in input/output with the operator. These components are interconnected through a communication line 59 such as a bus (hereinafter called the "bus").

The information processing program 61 contains procedure information for implementing the respective functions listed above on an information processing apparatus, when it is executed by the processor 51. Specifically, the information processing program 61 implements functions for interacting with a viewer or an operator through the input/output device 63 as required, inputting and outputting data between the external storage device 55 and the memory 53, reading data stored in the memory 53 through the wired communication interface unit 58 and radio communication interface unit 57, and transmitting data on the memory 53 to another information processing apparatus.

The information processing program 61 may be previously stored in the memory 53 or external storage device 55, or loaded into the information processing apparatus from another device through a portable storage medium or a communication medium (a network, or a carrier wave, a digital signal and the like which propagate through a network) available for the information processing apparatus.

The respective functions described above may be implemented by dedicated hardware components.

In this embodiment, two management methods, i.e., a hierarchical management method and a non-hierarchical management method are illustrated for managing the mobile terminals and radio base stations.

In the hierarchical management method, each base station manages mobile terminals which can communicate with the base station directly or in the multi-hop mode. Specifically, (1) each base station ensures a communication path information for communicating with a mobile terminal (by exchanging adjacent terminal information with the mobile terminal). (2) Each base station transmits the communication path information to the base station management terminal. (3) The base station management terminal detects a communication path to each mobile terminal with reference to the communication path information to create communication path information.

With the foregoing configuration, the adjacent terminal information is exchanged only between a base station and those mobile stations which are accommodated in the base station. Therefore, even if there are a large number of base stations and mobile stations, the adjacent terminal information is not exchanged beyond the base station management terminal, resulting in a reduction in traffic which is caused by the exchange of the adjacent terminal information. However, the base stations and base station management terminal are required to have the functions (2), (3).

In the non-hierarchical management method, on the other hand, the adjacent terminal information is exchanged among all terminals, i.e., the base station management terminal, base stations, and mobile terminals. Therefore, when there are a large number of base stations and mobile terminals, an increase in the traffic results from the exchange of the adjacent terminal information. However, the base station and base station management terminal can be simpler in configuration because they do not require such functions as the aforementioned functions (2), (3).

2. Hierarchical Mobile Terminal Management Method

A method of managing the mobile terminals 37 and base station 11 will be described with reference to FIG. 3.

(301)

The base station 11 and mobile terminals 37 repeatedly communicate their respective adjacent terminal information with each other using the adjacent terminal information management functions 44 (for example, on a periodic basis) to create communication path information using the communication path setting functions 23, 43, respectively, and set the communication path information therein.

The adjacent terminal information includes (1) the address of a terminal which has transmitted the adjacent terminal information (adjacent terminal information originating terminal); (2) the addresses of terminals which are adjacent to the terminal which has transmitted the adjacent terminal information; (3) a situation as to how the terminal which has transmitted the adjacent terminal information is located with respect to the "terminals adjacent to the terminal which has transmitted the adjacent terminal information" (for example, the adjacent terminal information can be communicated in two directions, the adjacent terminal information can be communicated only in one direction, the adjacent terminal information has not been communicated for a certain period, and the like), and the like.

The adjacent terminal information, when communicated, can be contained, for example, in a communication packet such as OSPF (Open Shortest Path First) which is a known protocol implemented in routers, "Hello Message" repeatedly communicated between devices in OLSR (Optimized Link State Routing Protocol), which is a routing protocol of the ad hoc network, and the like.

Each of the communication path setting functions 23, 43 determines a communication path upon transmission of communication packets in accordance with the type of a communication path (whether it consists only of a radio communication path or includes a wired communication path), the number of times of hopping until a destination node, the amount of a remaining battery in a communication relay terminal, a radio field strength between terminals in communication, the communication performance such as a delay time between the terminals in communication, throughput, packet loss rate, and jitter, and so forth.

The adjacent terminal information may be communicated at regular intervals or at a period which is varied in accordance with at least one of combinations among a moving speed of the mobile terminal and its changing rate, and a radio field strength associated with adjacent terminals and its changing rate.

(302)

Each of the base station 11 (ST–x), (x=A, B, . . . ) repeatedly transmits its communication path information 65 (TABLE (ST–x)) to the base station management terminal 1 (for example, on a periodic basis)

(303)

The base station management terminal 1 repeatedly creates communication path information TABLE (Adm) to each of the mobile terminals 37 using the communication path information TABLE (ST–x) sent from each base station, and sets the communication path information TABLE (Adm) therein.

3. Non-Hierarchical Mobile Terminal Management Method

A method of managing the mobile terminals 37 and base station 11 will be described with reference to FIG. 4.

The base station B 11g, mobile terminal BB 37k, and base station management terminal 1 repeatedly communicate their respective adjacent terminal information with each other using the adjacent terminal information management functions 25, 45, 9, respectively, (for example, on a periodic basis) to create their respective communication path information 69 (TABLE (ST-B)), 71 (TABLE (MN-B)), 67 (TABLE(Adm)) using the communication path setting functions 23, 43, 7, respectively, and set the communication path information, 69, 71, 67 therein using the communication path setting functions 23, 43, 7, respectively.

The adjacent terminal information may be communicated at regular intervals, or at a period which is varied in accordance with one or more of a moving speed of the mobile terminal and its changing rate, and a radio field strength associated with adjacent terminals and its changing rate.

The communication path setting functions 23, 43, 7 reference the associated communication path information 69, 71, 67, respectively, upon transmission of communication packets, to determine communication paths in accordance with the type of a communication path (whether it consists only of a radio communication path or includes a wired communication path), the number of times of hopping until a destination node, the amount of a remaining battery in a communication relay terminal, a radio field strength between the terminals in communication, the communication performance such as a delay time between the terminals in communication, throughput, packet loss rate, and jitter, and so forth. The delay time, throughput, packet loss rate, jitter and the like can be detected using unknown techniques.

Figure 5:
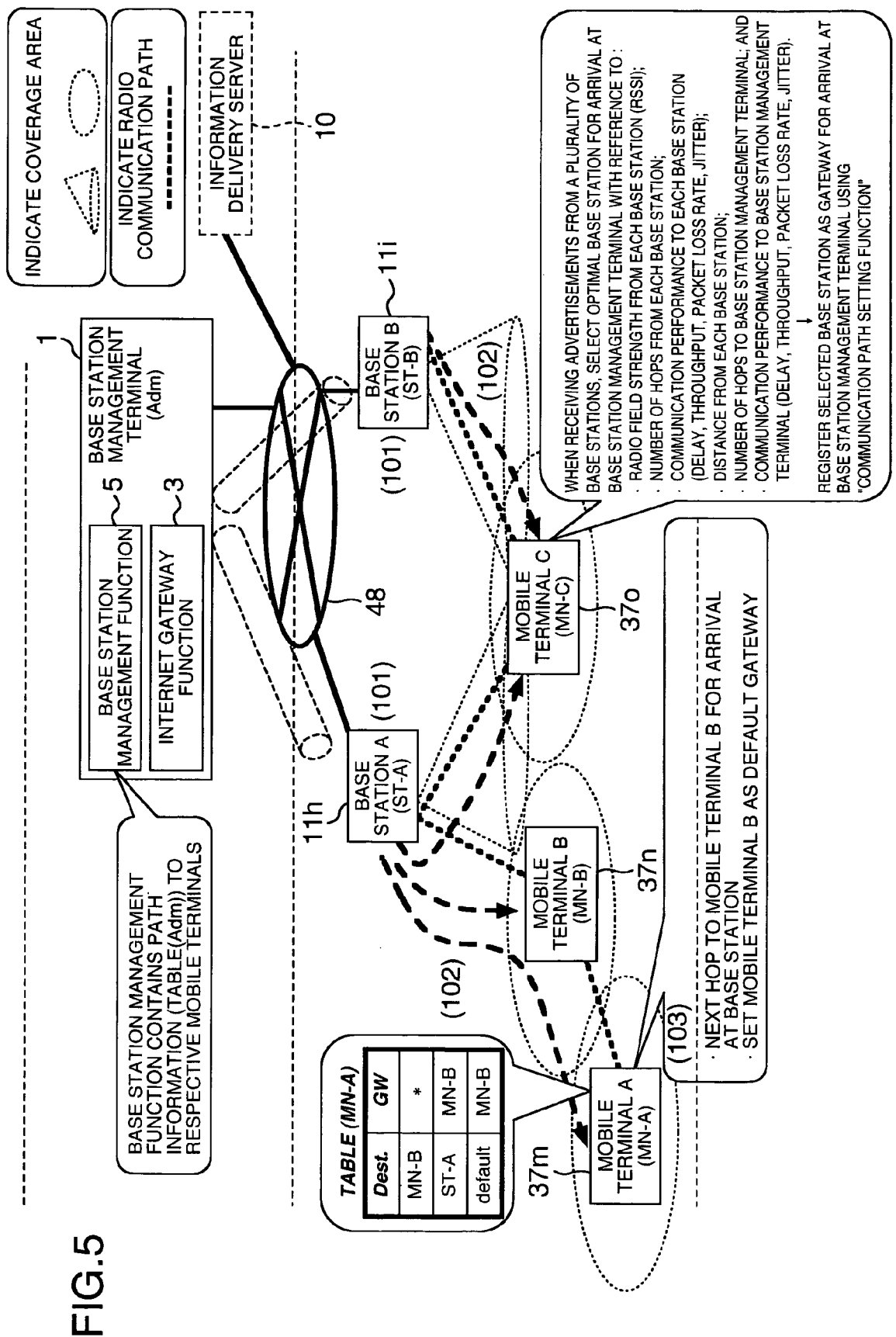
FIG. 5 is a diagram illustrating an Internet access method according to one embodiment.

4. Method of Accessing Internet from Mobile Terminal in Hierarchical Mobile Terminal Management Method Referring to FIG. 5, description will be made on a method of permitting the mobile terminal A 37m to send communication packets to the Internet gateway function 3 of the base station management terminal 1 or to the Internet gateway functions 24, 34 of the base stations 11, and permitting the mobile terminal A 37m to access the Internet in the multi-hop mode, even if the mobile terminal A 37m is out of the coverage area of the base station A 11h.

Figure 3:
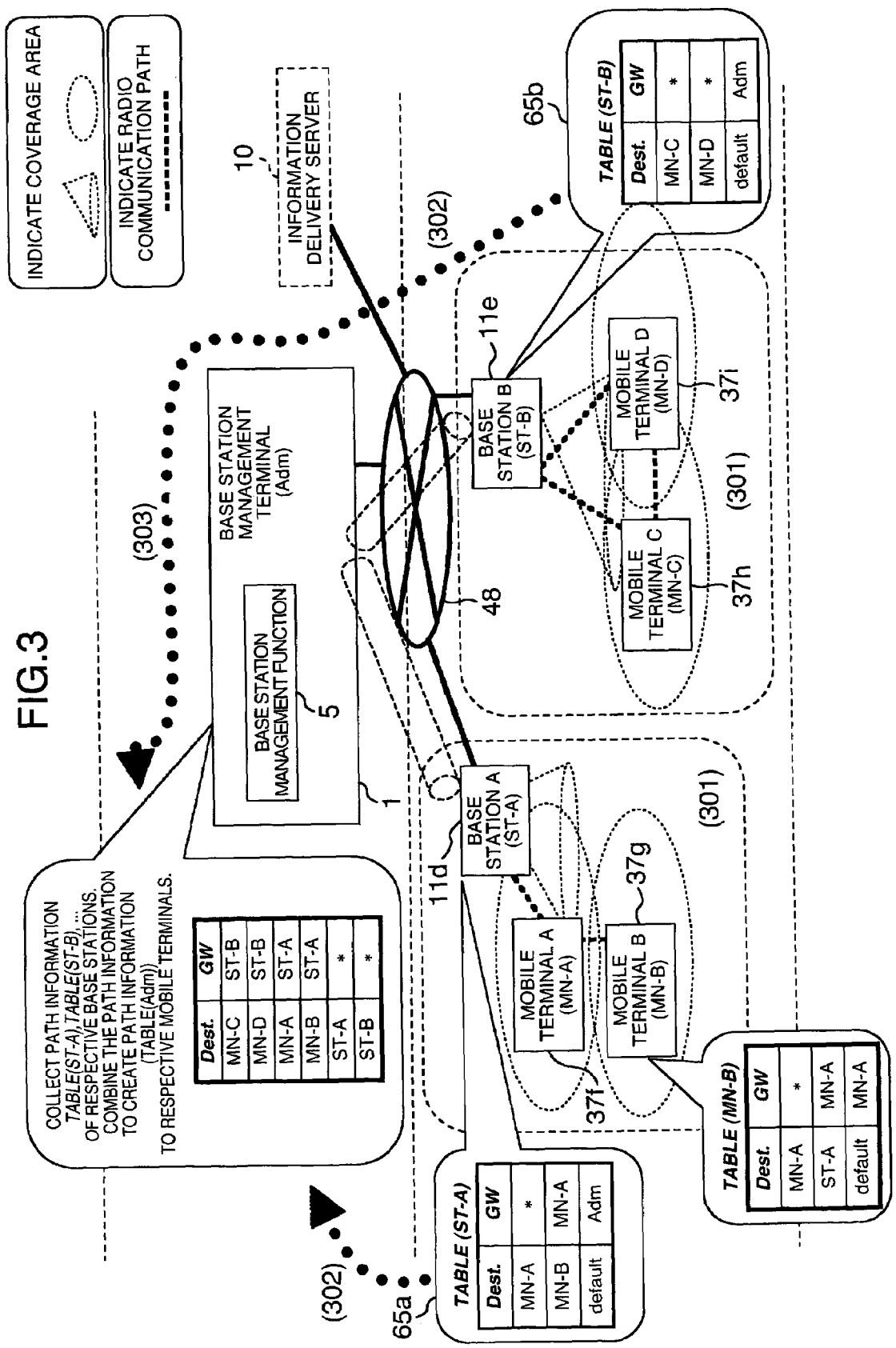
FIG. 3 is a diagram illustrating a terminal management method according to one embodiment.

Assume in FIG. 3, that the base station A 11h and mobile terminal A 37m are managed by the management method illustrated in FIG. 3.

<Internet Accessing Method>

(101)

Each of the base stations A 11h, B 11i has previously set the base station management terminal 1 having the Internet gateway function 3 as a default gateway in a known method. Alternatively, each of the base stations A 11h, B 11i may contain the Internet gateway function 24, 34. When a certain terminal transmits or forwards communication packets, the terminal sends the communication packets to a destination address described in the communication packets with reference to its communication path information, in which case the default gateway specifies the default destination of the communication packets, which is selected when the communication packets do not indicate a terminal to which the communication packets are transmitted (adjacent terminal).

(102)

Each base station 11 references the communication path information TABLE (ST-x) (x=A, B, . . . ) contained therein as required, and advertises its address to all mobile terminals 37 accommodated in this base station 11 through broadcasting, multicasting or unicasting.

(103)

The communication path setting function 43 of each mobile terminal 37, which has received the advertisement of the address from the base station 11, references the address included in the advertisement, and also references the communication path information contained therein to select from adjacent terminals an adjacent terminal which should be assigned to be the destination for transmitting the communication packets to the advertised address, and sets this adjacent terminal as a default gateway.

For example, when the mobile terminal A 37m references the communication path information contained therein to detect, as a result, that a mobile terminal B 37n is an adjacent terminal for enabling the communication packets to arrive at the base station A 11h, the mobile terminal A 37m sets this mobile terminal B 37n as a default gateway.

If the mobile terminal B 37n also makes a similar setting (setting the base station A 11h as a default gateway which is the destination to which the communication packets should be sent), the communication packets are transmitted from the mobile terminal A 37m and arrive at the base station A 11h through the mobile terminal B 37n.

Since each mobile terminal repeatedly sets a default gateway (for example, on a periodic basis) for sending communication packets to the base station as described above, the mobile terminal, even distanced by two hops or more from the base station, can send communication packets to the Internet gateway 3 to access the Internet.

When a mobile terminal receives advertisements from a plurality of base stations 11, the mobile terminal appropriately references at least one of combinations among the radio field strength from each of the base stations 11, the number of hops from each of the base stations 11, the communication performance up to each of the base stations 11 (one or more combinations among a delay, throughput, packet loss rate, jitter and the like), the distance from each of the base stations 11 to the mobile terminal, the number of hops to the base station management terminal 1, and the communication performance up to the base station management terminal 1 (one or more combinations among a delay, throughput, packet loss rate, jitter and the like) to select an optimal base station 11 for sending the communication packets to the base station management terminal 1.

The mobile terminal 37 registers a selected base station 11 as a default gateway for sending communication packets to the base station management terminal 1 using the communication path setting function 43.

5. Method of Accessing Internet from Mobile Terminal in Non-Hierarchical Mobile Terminal Management Method Referring to FIG. 6, description will be made on a method for enabling a mobile terminal A 37q to send communication packets to an Internet gateway in the multi-hop mode to access the Internet from the mobile terminal A 37q, even if the mobile terminal A 37q is located out of the coverage area of a base station A 11j.

Figure 4:
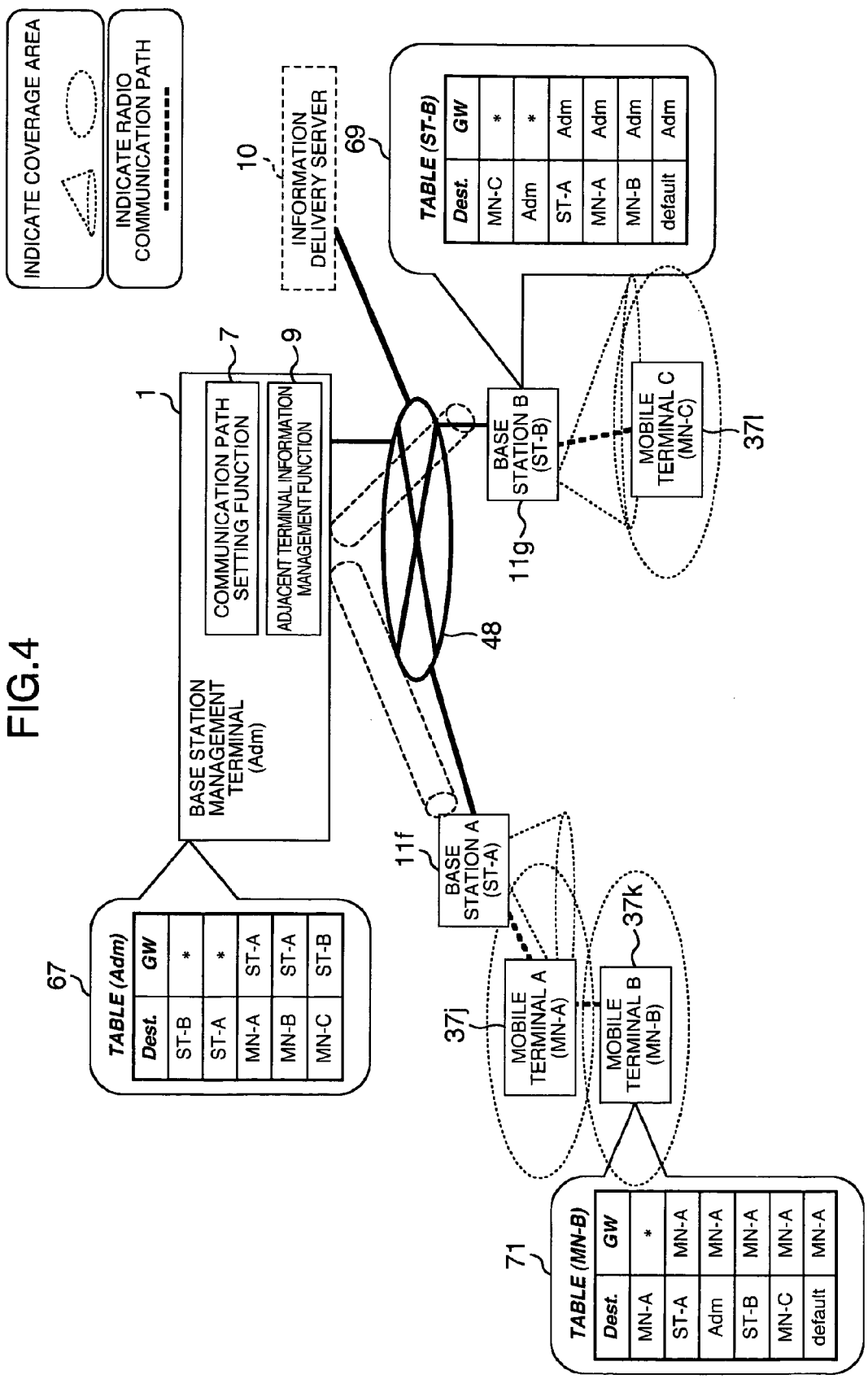
FIG. 4 is a diagram illustrating another terminal management method according to one embodiment.
Figure 6:
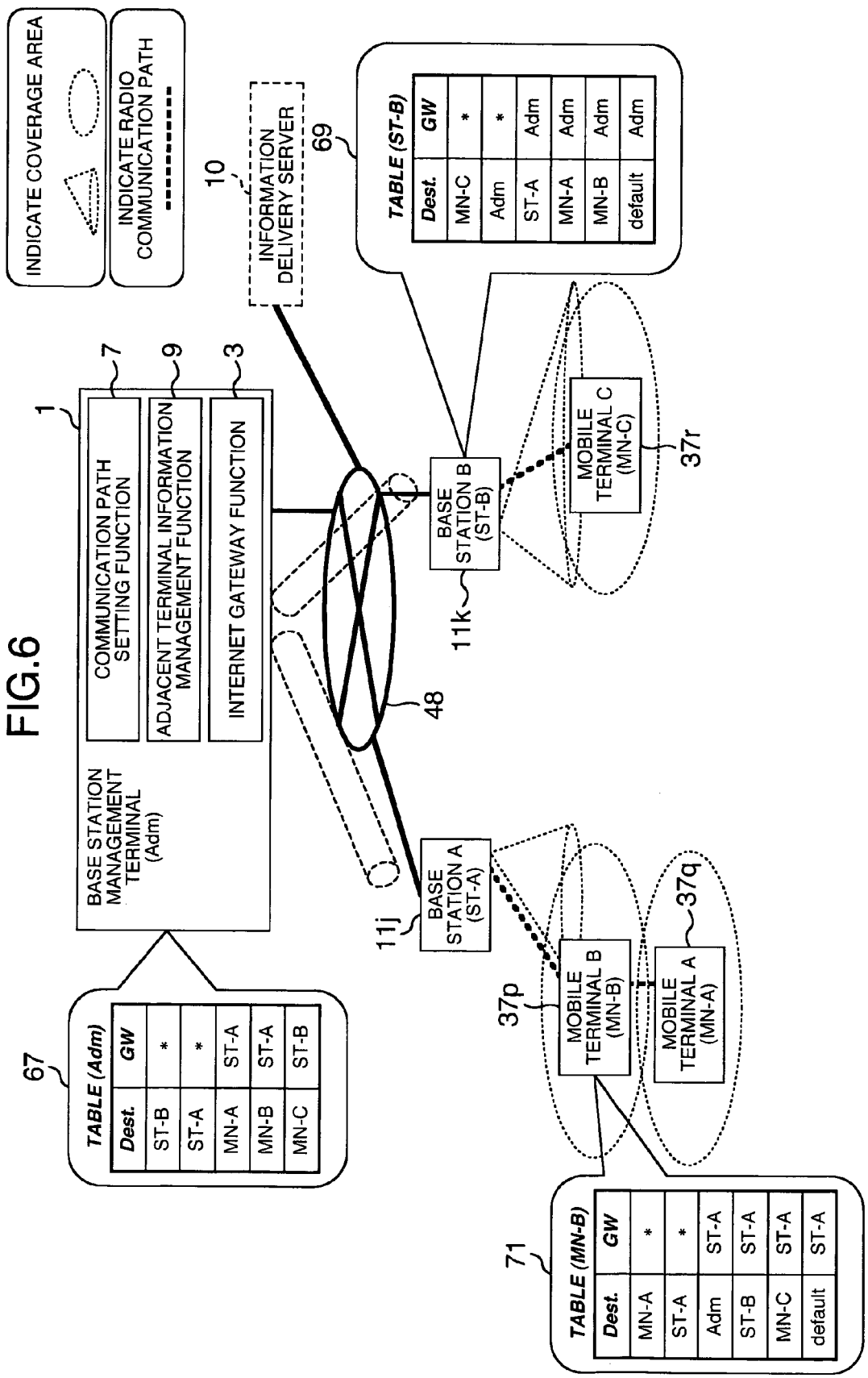
FIG. 6 is a diagram illustrating another Internet access method according to one embodiment.

In FIG. 6, the base stations 11 and mobile terminals 37 are managed by the management method illustrated in FIG. 4. With the management method illustrated in FIG. 4, the base station management terminal 1, base stations 11, and mobile terminals 37 have communication path information 67 (TABLE (Adm)), 69 (TABLE (ST-x) (x=A, B, C, . . . )), 71 (TABLE (MMN-x) (x=A, B, C, . . . ), respectively.

<Internet Accessing Method>

(401)

The base station management terminal 1 references the communication path information TABLE (Adm) 73 contained therein as required to advertise its own address to the base stations 11 and mobile terminals 37 through broadcasting, multicasting, or unicasting.

(402)

Each of the mobile terminals 37 and each of the base stations 11 sets an adjacent terminal for sending communication packets to the base station management terminal having the address included in the advertisement as a default gateway.

For example, when the mobile terminal A 37q detects that a mobile terminal B 37p is an adjacent terminal for enabling the communication packets to arrive at the base station management terminal 1 with reference to the communication path information contained therein, the mobile terminal A 37q sets this mobile terminal B 37p as a default gateway.

Since the mobile terminal B 37p and base station A 11j also make a similar setting (for setting a default gateway for enabling the communication packets to arrive at the base station management terminal 1), the communication packets can be transmitted from the mobile terminal A 37q to the base station management terminal 1 through the mobile terminal B 37p and base station A 11j.

When all the mobile terminals and base stations repeatedly set a default gateway (for example, on a periodic basis) for enabling communication packets to arrive at the base station management terminal 1, a mobile terminal, which is distanced even by several hops from the base station management terminal 1, can send communication packets for accessing the Internet, and can therefore access the Internet.

6. Method of Communicating between Mobile Terminals in Multi-Hop Mode through Base Station, Wired Network, and Mobile Terminal in Hierarchical Mobile Terminal Management Method Referring to FIG. 7, description will be made on a method of enabling communications between mobile terminals 37 in the multi-hop mode through the base station 11, Internet 48, and mobile terminal 37.

Figure 7:
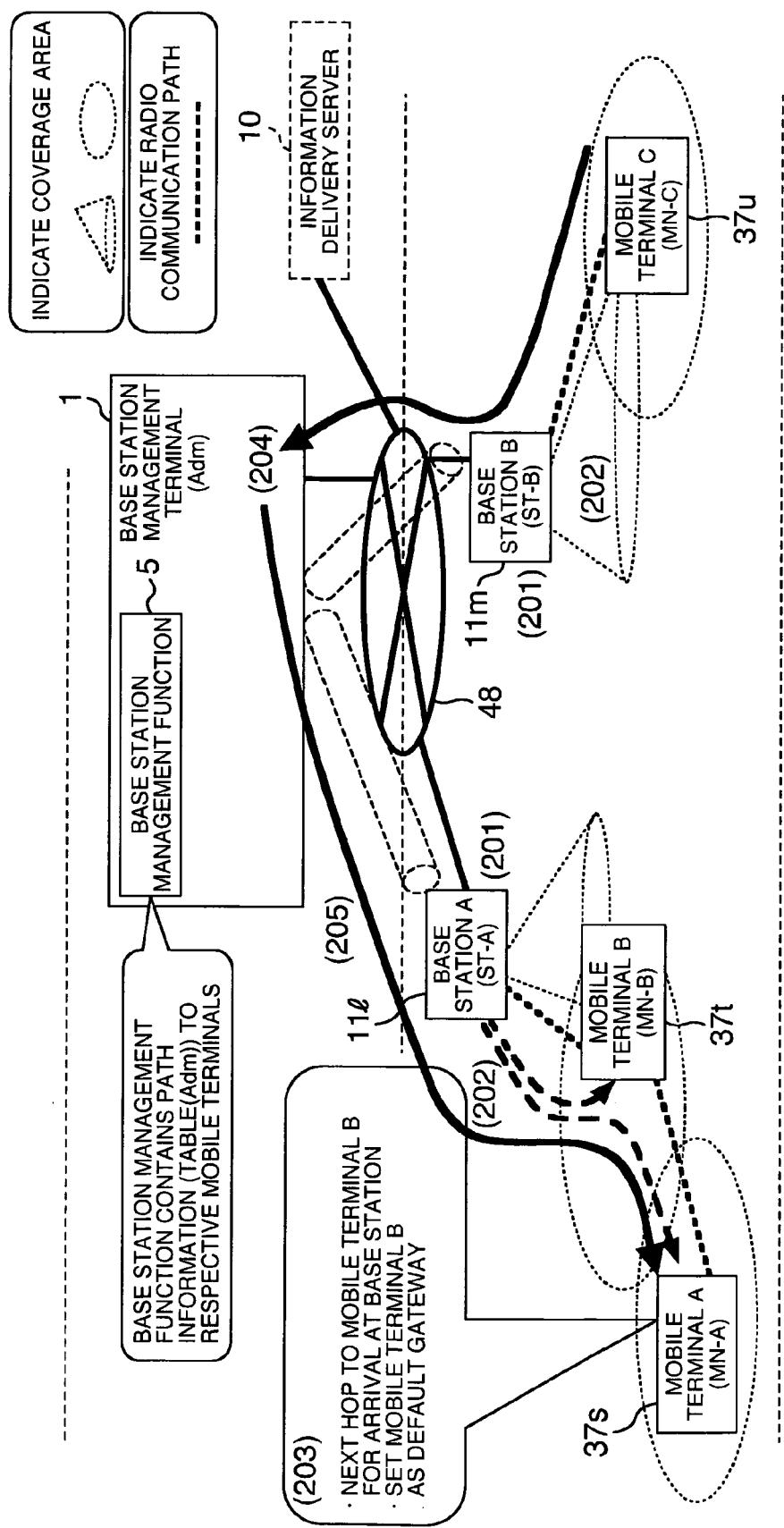
FIG. 7 is a diagram illustrating an inter-terminal communication method according to one embodiment.

Assume in FIG. 7 that the base stations 11 and mobile terminals 37 are managed by the management method illustrated in FIG. 3.

<Precondition>

(201)

Each of the base stations 11 has previously set the base station management terminal 1 having the Internet gateway function 3 as a default gateway.

(202)

Each of the base stations 11 references the communication path information TABLE (ST–x) (x=A, B, . . . ) contained therein, and advertises its own address to all mobile terminals 37 managed by the base station itself through broadcasting, multicasting, or unicasting.

(203)

Each of the mobile terminals 37 which have received the advertisement of the address from the base station 11 references the address included in the advertisement, and further references the communication path information contained therein, if necessary, to set an adjacent terminal for sending communication packets to this address as a default gateway.

In an ad hoc network, since an outgoing path is not necessarily the same as an incoming path between two terminals, the originator of an advertised address is not necessarily assigned to be a default gateway, so that every mobile terminal must reference the communication path information contained therein to set a default gateway.

<Communicating Method>

Description will be made on a communication made between a mobile terminal C (MN-C) 37u and a mobile terminal A (MN-A) 37s in FIG. 7.

When the mobile terminal C (MN-C) 37u transmits communication packets destined to the mobile terminal A (MN-A) 37s, the mobile terminal C (MN-C) 37u references a default gateway setting item contained therein to confirm that the default gateway is a base station B 11m, and then transmits the communication packets to the base station B 11m. Upon receipt of the communication packets from the mobile terminal C (MN-C) 37u, the base station B (ST-B) 11m references a default gateway setting item contained therein to confirm that the default gateway is the base station management terminal (Adm) 1, and transmits the communication packets to the base station management terminal (Adm) 1. In this way, the communication packets are originated from the mobile terminal C (MN-C) 37u and arrive at the base station management terminal 1 (204).

Upon receipt of the communication packets, the base station management terminal (Adm) 1 references the communication path information TABLE(Adm) contained therein for a communication path to the mobile terminal A(MN-A) 37s to confirm that an adjacent terminal for sending the communication packets to the mobile terminal A(MN-A) 37s is a base station A(ST-A) 111. Then, the base station management terminal (Adm) 1 transmits the communication packets to the base station A(ST-A) 111.

Further, the base station A(ST-A) 111, upon receipt of the communication packets, references the communication path information TABLE(ST-A) contained therein for a communication path to the mobile terminal A(MN-A) 37s to confirm that an adjacent terminal for sending the communication packet to the mobile terminal A(MN-A) 37s is a mobile terminal B(MN-B) 37t. Then, the base station A(ST-A) 111 transmits the communication packets to the mobile terminal B(MN-B) 37t.

Further, upon receipt of the communication packets, the mobile terminal B(MN-B) 37t references the communication path information TABLE(MN-B) contained therein for a communication path to the mobile terminal A(MN-A) 37s, and transmits the communication packets to the mobile terminal A(MN-A) 37s. In this way, the communication packets arrive at the mobile terminal A(MN-A) 37s from the base station management terminal 1. (205)

The transmission of communication packets from the mobile terminal C(MN-C) 37u to the mobile terminal A(MN-A) 37s (return way) is performed in a similar manner to implement communications between the mobile terminal A(MN-A) and the mobile terminal C(MN-C).

In this way, communications can be made between mobile terminals in the multi-hop mode through the base station 11, Internet 48, and mobile terminal 37.

A plurality of candidate communication paths can exist for communications between the mobile terminal A(MN-A) 37s and the mobile terminal C(MN-C) 37u, such as a direct communication, or a multi-hop based radio-only communication path, as well as the communication path through the base station 11, Internet 48, and mobile terminal 37. In this event, an appropriate communication path may be determined in accordance with the type of a communication path (whether it consists only of a radio communication path or includes a wired communication path), the number of times of hopping until a destination node, the amount of a remaining battery in a communication relay terminal, the radio field strength between the terminals in communication, the communication performance such as a delay time between the terminals in communication, throughput, packet loss rate, and jitter, and so forth.

7. Method of Communicating between Mobile Terminals in Multi-Hop Mode through Base Station, Wired Network, and Mobile Terminal in Non-Hierarchical Mode Terminal Management Method Referring to FIG. 8, description will be made on a method which enables communications between mobile terminals in the multi-hop mode through the base station 11, Internet 48, and mobile terminal 37.

Figure 8:
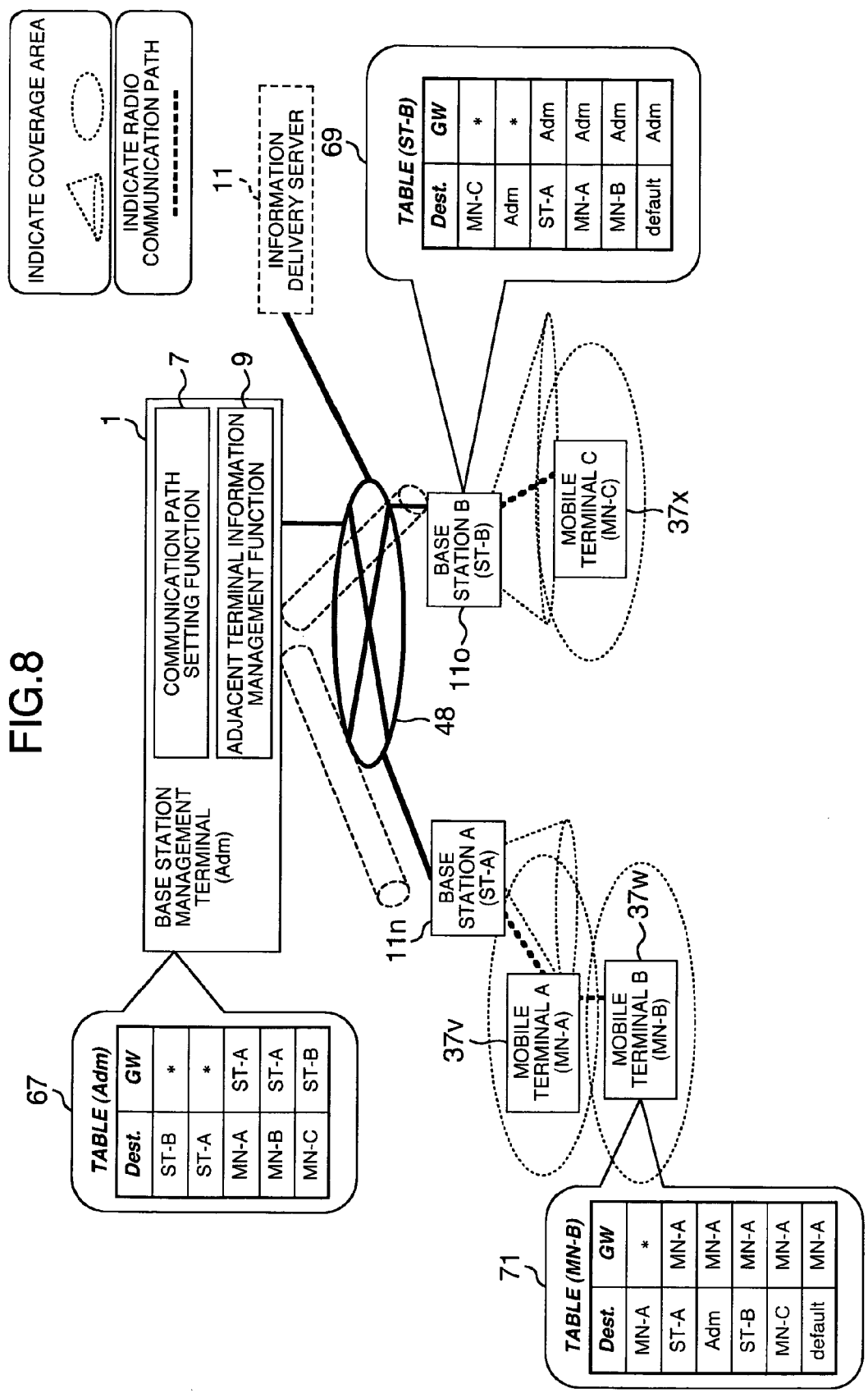
FIG. 8 is a diagram illustrating another inter-terminal communication method according to one embodiment.

In FIG. 8, the base stations 11 and mobile terminals 37 are managed by the management method illustrated in FIG. 4. With the management method illustrated in FIG. 4, the base station management terminal 1, base stations 11, and mobile terminals 37 have communication path information 67 (Table(Adm)), 69 (TABLE(ST–x) (x=A, B, . . . )), 71 (TABLE(MN–x) (x=A, B, C, . . . )), respectively.

<Communication Method>

A communication made between a mobile terminal C(MN-C) 37x and a mobile terminal B(MN-B) 37w in FIG. 8 will be given as an example.

When the mobile terminal C(MN-C) 37x transmits communication packets to the mobile terminal B(MN-B) 37w, the base station management terminal 1, base station A(ST-A), base station B(ST-B), and mobile terminal A(MN-A) sequentially forward the communication packets to adjacent terminals for sending the communication packets to the mobile terminal B(MN-B) 37w which is set in the respective communication path information TABLE(Adm), TABLE (ST-A), TABLE(ST-B), and TABLE(MN-A), thereby sending the communication paths to the mobile terminal B(MN-B) 37w.

Likewise, when the mobile terminal B(MN-B) 37w transmits communication packets to the mobile terminal C(MN-C) 37x, the communication packets arrive at the mobile terminal C(MN-C) 37x.

In this way, the multi-hop based communications can be accomplished between mobile terminals through the base station 11, Internet 48, and mobile terminal 37.

A plurality of candidate communication paths can exist for communications between the mobile terminal B(MN-B) 37w and the mobile terminal C(MN-C) 37x, such as a direct communication, or a multi-hop based radio-only communication path, as well as the communication path through the base station 11, Internet 48, and mobile terminal 37. In this event, an appropriate communication path may be determined in accordance with the type of a communication path (whether it consists only of a radio communication path or includes a wired communication path), the number of times of hopping until a destination node, the amount of a remaining battery in a communication relay terminal, the radio field strength between the terminals in communication, the communication performance such as a delay time between the terminals in communication, throughput, packet loss rate, and jitter, and so forth.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network system in which a base station management terminal, a base station, and a mobile terminal are connected through a radio communication and a wired communication, wherein:

the base station management terminal comprises:
an Internet gateway function for relaying an access to the Internet;
a base station management function for managing communication path information of each base station;
a communication path setting function for setting a communication path to another terminal; and
an adjacent terminal information management function for managing adjacent terminal information of the base station management terminal itself and adjacent terminal information of other terminals, the base station comprises a radio communication function, a communication path setting function, an adjacent terminal information management function, and a base station radio communication interface direct communication blocking function for preventing direct radio communication between base stations, the mobile terminal comprises a radio communication function, a communication path setting function, and an adjacent terminal information management function, and the base station management terminal and the communication base station exchange the adjacent terminal information with each other.

2. A radio communication network system according to claim 1, wherein:

the base station comprises the radio communication function in a plurality of modes, and further comprises an infrastructure mode communication base station function.

3. A radio communication network system according to claim 1, wherein:

the respective adjacent terminal information management functions of the base station and the mobile terminal transmit and receive the adjacent terminal information with each other, the communication path setting functions of the base station management terminal, the base station, and the mobile terminal set a communication path in the base station management terminal, the base station, the mobile terminal, respectively, the base station transmits its own communication path information to the base station management terminal, and the base station management terminal combines the communication path information transmitted from the respective base stations to create the communication path information including the mobile terminals, and sets the communication path information in the base station management terminal itself.

4. A radio communication network system according to claim 1, wherein:

the respective adjacent terminal information management functions of the base station, the mobile terminal, and the base station management terminal transmit and receive the adjacent terminal information with one another, and the communication path setting functions of the base station, the mobile terminal, and the base station management terminal create the respective communication path information, and set the communication path information in of the base station, the mobile terminal, and the base station management terminal, respectively.

5. A radio communication network system according to claim 1, wherein:
the communication path setting function determines a communication path in accordance with at least one of combinations among a communication path, the number of hops up to a destination terminal, the amount of a remaining battery of a communication relay terminal, a radio field strength between terminals in communication, and communication performance including one or more of a delay time between the terminals in communication, a throughput, a packet loss rate, and jitter.

6. A radio communication network system according to claim 1, wherein:
the adjacent terminal information management function sets a adjacent terminal information transmission/reception period to a fixed value, or changes the period in accordance with at least one of combinations among a moving speed of a mobile terminal, a changing rate of the moving speed, a radio field strength to an adjacent terminal, and a changing rate of the strength.

7. A radio communication network system according to claim 1, wherein:
the communication path setting function of the base station previously sets the base station management terminal having the Internet gateway function as a default gateway,
the base station management terminal references the communication path information contained therein to advertise its own address to all the mobile terminals managed thereby, and
upon receipt of the advertisement of the address from the base station management terminal, the communication path setting function of the mobile terminal references the address included in the advertisement, and references the communication path information contained therein to set an adjacent terminal for arrival at the address as a default gateway in a communication path.

8. A radio communication network system according to claim 7, wherein:
upon receipt of advertisements of addresses from a plurality of the base stations, the communication path setting function of the mobile terminal references at least one of combinations among the radio field strength from each of the base stations, the number of hops from each of the base stations, the communication performance up to each of the base stations (one or more combinations among a delay, a throughput, a packet loss rate, and jitter), the distance from each of the base stations to the mobile terminal, the number of hops to the base station management terminal, the communication performance up to the base station management terminal (one or more combinations among a delay, a throughput, a packet loss rate, and jitter) as required to select one base station for sending a communication packet to the base station management terminal, and
the communication path setting function of the mobile terminal registers the selected base station as an adjacent terminal for enabling the packet to arrive at the base station management terminal.

9. A radio communication system according to claim 1, wherein:
the base station comprises the Internet gateway function,
the base station references the communication path information contained therein to advertise its own address to all the mobile terminals accommodated therein, and
upon receipt of the advertisement of the address from the base station, the communication path setting function of the mobile terminal references the address included in the advertisement, and references the communication path information contained therein to set an adjacent terminal for arrival at the address as a default gateway in a communication path.

10. A radio communication network system according to claim 1, wherein:
the communication path setting function of the base station management terminal references the communication path information contained therein to advertise its own address to the base station and the mobile terminal, and
the communication path setting function of each of the mobile terminal and the base station sets an adjacent terminal for arrival at the base station management terminal having the address included in the advertisement as a default gateway in a communication path.

* * * * *